Feb. 8, 1938. J. A. BALL 2,107,623
MOTION PICTURE CAMERA DRIVE
Original Filed Aug. 20, 1931 3 Sheets-Sheet 1
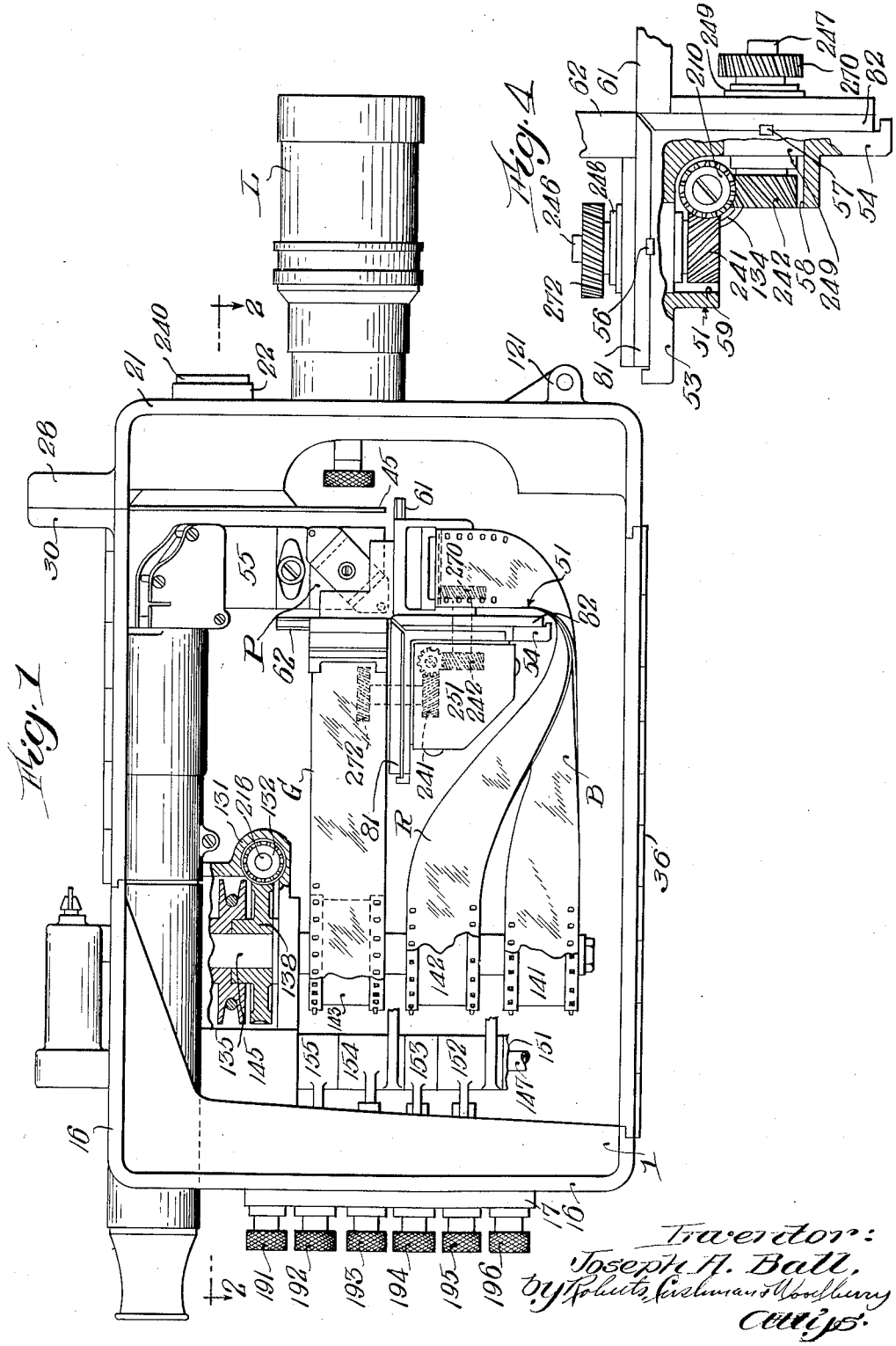
Inventor:
Joseph A. Ball,
by Roberts, Cushman & Woodbury
Attys.

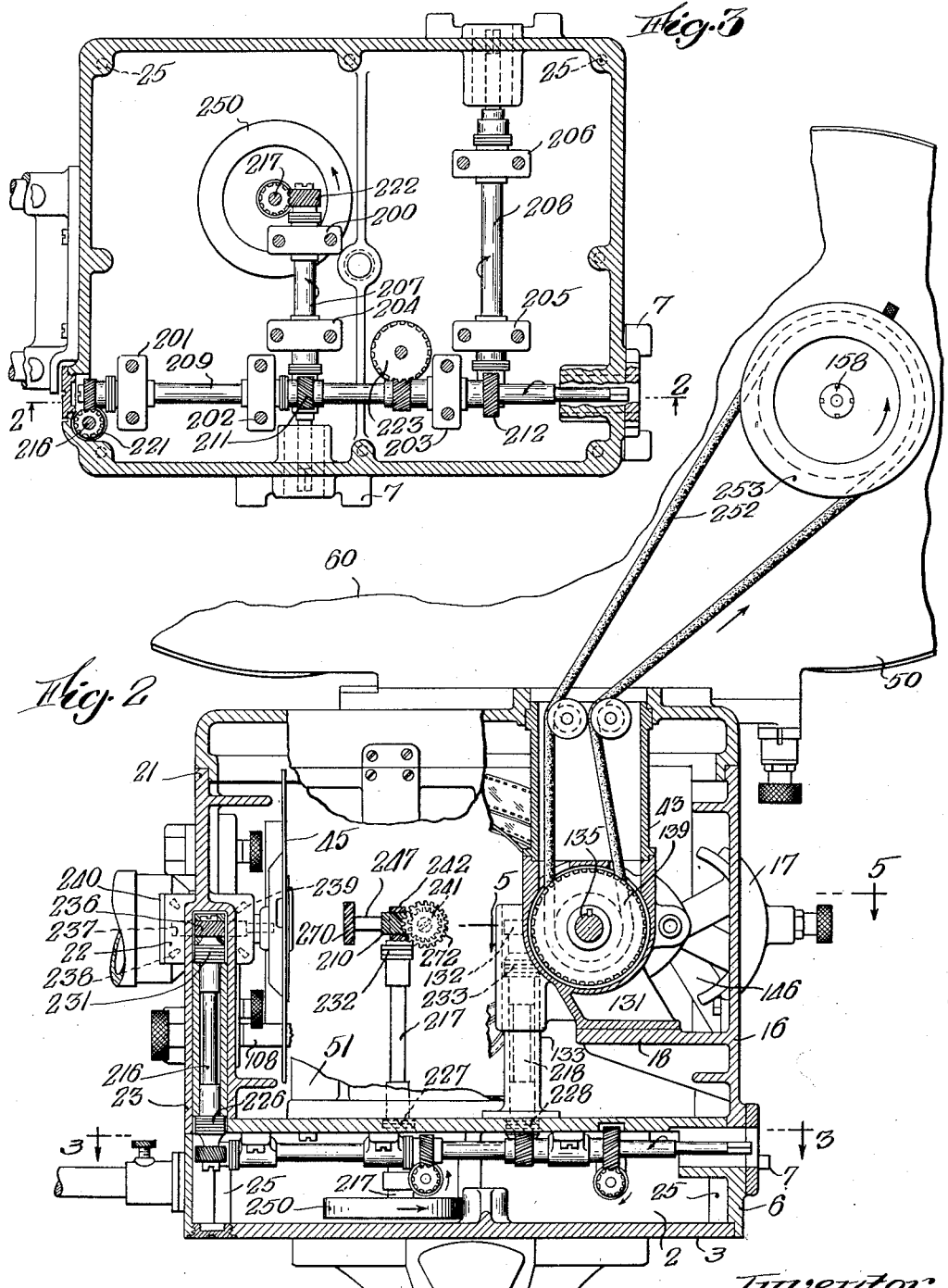

Feb. 8, 1938.                J. A. BALL                2,107,623
                     MOTION PICTURE CAMERA DRIVE
           Original Filed Aug. 20, 1931          3 Sheets-Sheet 3
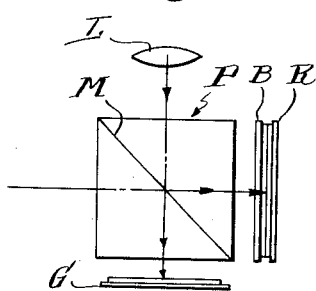
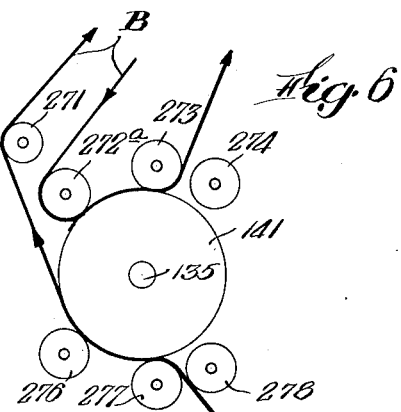
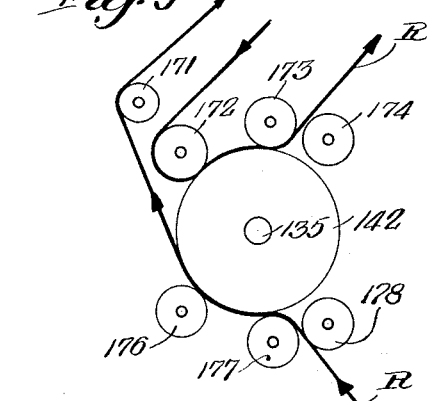
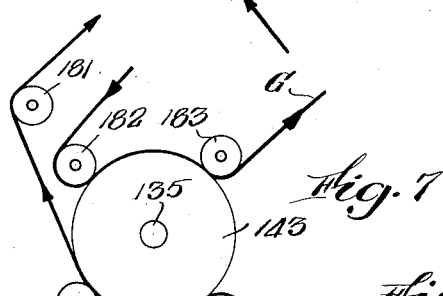
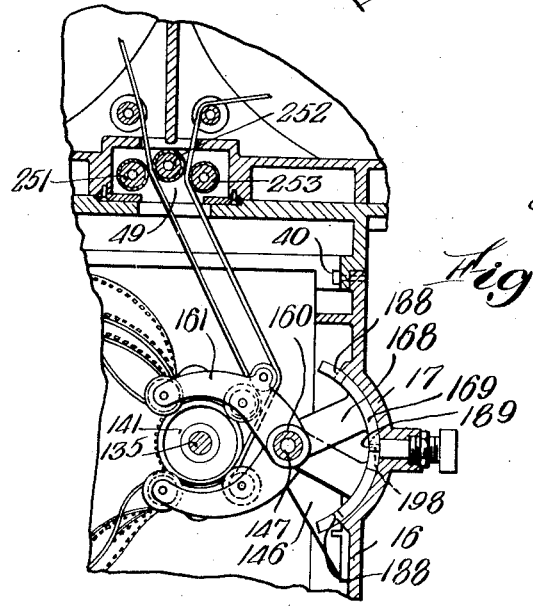
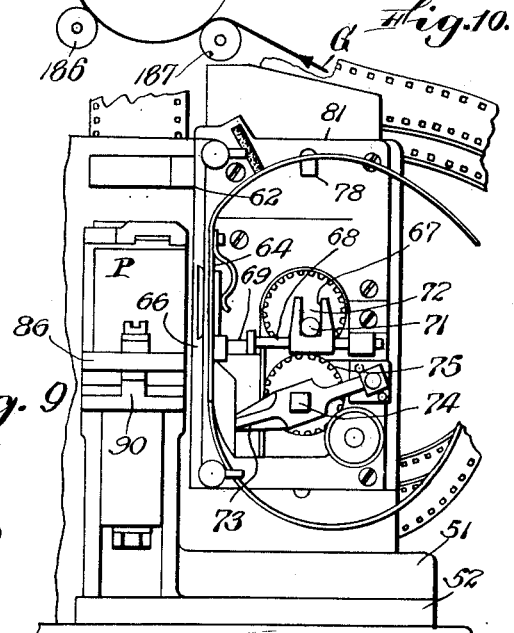
Inventor
Joseph A. Ball Patented Feb. 8, 1938

2,107,623

UNITED STATES PATENT OFFICE 2,107,623

MOTION PICTURE CAMERA DRIVE

Joseph A. Ball, Los Angeles, Calif., assignor to Technicolor Motion Picture Corporation, Hollywood, Calif., a corporation of Maine Original application August 20, 1931, Serial No. 558,193. Divided and application April 21, 1933, Serial No. 667,222. Divided and this application January 22, 1936, Serial No. 60,233

5 Claims. (Cl. 88—16.4)

The present invention relates to cameras for simultaneous exposure of a plurality of films, especially for the purpose of photography in natural colors, and more particularly to film confining and advancing devices peculiarly adapted for cameras of this type, this being a division of the copending application Serial No. 667,222, filed April 21, 1933 now Patent No. 2,059,199.

Objects of the invention are to provide a motion picture camera which handles conveniently and exactly a plurality of films, some or all of which may be superposed at the film aperture or apertures of the camera; to provide an arrangement for feeding a plurality of films from supply reels through a camera of this nature and for again winding them on conveniently arranged take-up reels; to provide an arrangement for such a camera which permits easy threading of a plurality of films and assures steady progress of the films through the camera along short and uncomplicated paths. Further objects are to provide a smooth and equalized drive for the film movements which also permits adjustment of the movements without affecting the drive, an improved gear arrangement for driving the various moving parts of the camera, and generally to provide a camera for taking motion pictures in natural colors which can be easily and conveniently operated and which permits efficient commercial production of motion picture films under conditions similar to those required for the taking of ordinary motion picture negatives. Additional objects of my invention will be apparent from the following description of a typical concrete embodiment illustrated by drawings, in which:

Fig. 1 is a top plan of a motion picture camera incorporating the present invention, with the cover removed and parts broken away;

Fig. 2 is a longitudinal cross-section on line 2—2 of Fig. 1 with the supporting block partly broken away;

Fig. 3 is a section on line 3—3 of Fig. 2;

Fig. 4 is a detail of Fig. 1, with the gear housing removed and with parts shown in section;

Figs. 5, 6 and 7, respectively, are diagrammatic showings of the manner of threading the films;

Fig. 8 is a diagrammatic plan of the prism system; and

Fig. 9 is a vertical longitudinal section showing the sprocket drive; and

Fig. 10 is a side elevation of the central supporting block with film movement, as seen from the top of Fig. 1.

The herein disclosed embodiment of the present invention is incorporated in a camera the design of which is completely described in copending application Serial No. 558,193, filed August 20, 1931, of which the above-mentioned copending application Serial No. 667,222 is a division now Patent No. 2,072,091. This camera is adapted for taking photographs in natural colors according to the methods disclosed and claimed in my Patents No. 1,889,030, of November 29, 1932, and No. 2,000,058 of May 7, 1935. This camera comprises a lens system L (Fig. 8) and a prism P with a partially reflecting mirror M and two apertures in planes perpendicular to each other for exposing film G and superposed films B and R, respectively. The various mechanisms of the camera are mounted within a sturdy housing in such a manner that the parts which require accurate positioning with respect to each other are combined in separate units which are structurally capable of maintaining the accuracy of position independently of other units and which are separately accessible and adjustable, whereas parts which do not require particular accuracy of assembly and operation are distributed in other units.

Referring especially to Figs. 1, 2 and 3, the housing 1, which is made of ribbed metal parts (preferably of light weight alloy), is built upon a base 2 comprising a plate 3 and a gear box 6. The gear box 6 has receptacles 7 for the connecting plug of a flexible shaft or other source of power for driving the various movements of the camera. The base plate and gear box are screwed together, threaded bosses 25 being provided for this purpose within the gear box casting. Inside the gear box is mounted a power distributing device with various gears and a flywheel which will later be described in detail; and on top of the gear box is mounted the central supporting block 51 for the light splitting system and the film movements, and the sprocket drive shaft housing 133 (Fig. 2), both also to be described later. Mounted upon the gear box 6 is a rear wall 16 which also covers a part of each of the longer sides of the camera as shown in Fig. 1. The rear wall 16 has a cylindrical bulge 17 for the sprocket roller mechanism, brackets 18 and 146 (Fig. 2) and a hollow extension 145 (Fig. 1) for supporting the sprocket roller mechanism. The front wall 21 forms a housing 22 for the shutter shaft and another housing 23 (Fig. 2) for the shutter drive shaft.

The block 51 (Figs. 1 and 2), which supports the light-dividing prism system and the two film movements of the camera, is screwed directly to gear box 6. The block 51 has a main cross-section in the shape of an L, and the housing 134 for the drive shaft 218 is provided in the angle of this L-shaped support (Figs. 1, 2 and 4). The block 51 has also a prism bracket 55 (Fig. 1). The mutually perpendicular machined faces of flanges 53 and 54 and of bracket 55 correspond to the faces of the prism unit. The flanges 53 and 54 have vertical key ways 56 and 57 in their faces for positioning and adjusting the film movements, and also openings 58 and 59 (Fig. 4) for the bearings 248 and 249 of the film movement drive shafts hereinafter described. The film movements driven through gear wheels 272 and 270 (Fig. 4) are of any conventional design, for example of the type shown in Fig. 10. In that figure, 66 are registering pins mounted on a yoke 67 and a rod 68 with fork 69. The registering pins are reciprocated perpendicularly to the aperture plane by means of cam 71 which is eccentrically mounted on gear 72. The movement further comprises feeding pins 73 driven by cam 74 of gear 75 which meshes with gear 72. Each movement has an aperture plate 61 and 62 (Fig. 4) respectively, and corresponding back plates 64 (Fig. 10) between which the films are guided. The back plates are integral with aperture flanges 81 and 82 (Figs. 4 and 10) with which they form angular pieces, the flanges being slidably fastened to the block flanges 53 and 54. It will be evident that the aperture plates 61 and 62 form angles of 90° with each other and the bracket face, and that the optical axes of the light dividing prism P, mounted on bracket 91, will be substantially perpendicular to the respective aperture plates.

Referring especially to Figs. 1 to 7, bracket 18 on rear wall 16 of the camera housing, supports a sprocket gear housing 131. This housing encloses the spiral gear 132 which is mounted on shaft 218 ascending from the power distribution gear and protected at its lower part by shaft housing 133 (Fig. 2) screwed to gear box 6. Housing 131 also supports sprocket shaft 135 (Fig. 2) by means of suitable bearings. Within the housing 131 a gear wheel 138 which meshes with spiral gear 132, is fixed to shaft 135. Keyed to shaft 135 are three sprockets 141, 142 and 143. Housing 131 and the rear wall 16 support, with bracket 146, a tube 147 upon which a number of scissor units, corresponding to the number of film sprockets used, are rotatably mounted, units 151, 152, 153, 154, and 155 being shown in Fig. 1. Each scissor unit has a hub 160, a roller arm 161, a segment arm 168 and a segment 169 (Fig. 9). Two adjacent units cooperate like the blades of a scissors, swinging with their hubs on tube 147, the hubs of two cooperating scissor units being at opposite sides of the arms, with the roller arms intermediate thereof, and the segment arms attached at about the middle of the hubs. Each of the upper roller arms belonging to sprockets 141 and 142, supports (Figs. 5 and 6), by means of pins, four rollers 171, 172, 173, 174 and 271, 272ª, 273, 274, respectively, rollers 172, 173 and 272ª, 273 respectively, having the purpose of holding the film against the sprockets, whereas rollers 171, 271 and 174, 274, respectively, support the films as they leave the sprockets. The lower roller arms, belonging to sprockets 141 and 142, have only three rollers 176, 177, 178 and 276, 277, 278, respectively, arranged like upper rollers 172, 173, 174, 272, 273 and 274. The upper roller arm belonging to sprocket 143 has only three rollers 181, 182 and 183 corresponding to rollers 171, 172 and 173 of the corresponding arm of sprocket 142. The lower roller arm of sprocket 143 has two rollers 186 and 187 arranged similar to rollers 176 and 177 (Figs. 5, 6 and 7).

The segments 169 (Fig. 9) fit with their circular fronts into the bulge 17 of rear wall 16 of the camera, and each segment has two perforations 188, 189 which are adapted to receive pins 198 of six control knobs 191, 192, 193, 194, 195 and 196, one for each segment. Holes 188 correspond to the open or film releasing position of the roller arms, and perforations 189 to the closed or film engaging position thereof. By pulling back a control knob, the corresponding pin releases the perforations which it engaged, the segment and the roller arm can be rotated and the latter again arrested in its second position by releasing the control knob. The operation of the sprocket device, in cooperation with the films and the apertures, will be described hereinafter.

The camera comprises three different power driven units, namely, the aperture unit with two film feeding movements, the film sprocket and take-up spool drive, and the shutter drive. In order to make the various drives properly accessible and easily and independently adjustable, a power distribution gear is arranged in gear box 6, and the three units are independently driven by three shafts vertically ascending therefrom. The distribution gear comprises bearings 200, 201, 202, 203, 204, 205 and 206 (Fig. 3) attached to the top of the gear box and three shafts 207, 208, 209. Shafts 208 and 209 are connected with shaft 207 by spiral gears 211 and 212. Each of these three shafts 207, 208 and 209 has a square end for coupling it with a flexible shaft or other driving device by means of receptacles 7 (as described before), which permits power supply from either side and from the back of the camera. Vertical shafts 216, 217 and 218 are driven from shafts 207 and 209 by means of spiral gears 221, 222 and 223. The shafts 216, 217 and 218, respectively, are supported by thrust bearings 226, 227, 228, 231, 232, 233 (Fig. 2) and run in oil-tight housings 23, 133 and 134, as described hereinbefore. The shutter drive shaft 216 drives a shutter shaft 237 over spiral gear 236, supported in housing 22 of front wall 21 by two tapered roller bearings 238 and 239, and accessible through cover screw 240 (Fig. 2). A shutter 45 of conventional design is mounted on an extension of shaft 237 which protrudes beyond the housing 22. The shutter rotates between lens system L and prism system P (Fig. 1), partly in the housing formed by the halves 29 and 30 of front wall and side door, respectively, as described in the above-mentioned application Serial No. 558,193.

In order to assure harmonious operation of the two film movements they are both driven from shaft 217 over a single spiral gear wheel 210 meshing with two gear wheels 241 and 242 (Fig. 4). Shaft 217 runs in housing 134 of the main supporting block 51 in thrust bearings 227 and 232. Gear wheels 241 and 242 drive the two short film movement shafts 246 and 247 (Fig. 4) which are supported in aperture flanges 81 and 82 by means of bearings 248 and 249. As described in the above application, the aperture flanges 81 and 82, mounted on block flanges 53 and 54, are adjustable longitudinally of the block flanges. They may also be adjusted perpendicularly to the block flanges, as for example by shimming. This adjustment is made possible by the peculiar arrangement of gears 210, 241 and 242 whose mesh is not affected by such adjustments. Although the timing of the movements is very slightly affected thereby, the adjustment amounts ordinarily to only a few thousandths of an inch and its effect on timing is therefore negligible. These gears are enclosed in a cover 251 in the angle between the two main block flanges (Fig. 1). The film movement gear wheels 270 and 272 are fixed to the other ends of shafts 247 and 246, respectively, and drive the registering and advancing pins of the film movements, as described hereinbefore. Since the movements are intermittent in their action they require an intermittent flow of power supply which must be equalized by rotating masses. In order to prevent undesirable interferences between separate flywheels for each movement, a single flywheel 250 is employed according to the present invention. Since it is mounted on shaft 217, either within the gear box as shown in Fig. 2, or elsewhere, it acts upon both movements driven from the same shaft.

The sprocket drive shaft 218 supported by thrust bearings 228 and 233 runs within housings 133 and 131 and drives the gear wheel 138 (Fig. 1) on shaft 135 by means of spiral gear 132. From pulley 139, also fastened to the sprocket shaft 135, a belt drive 252 leads through housing 43 (Fig. 2) to pulley 253 of the take-up spool gear which again drives in appropriate manner the three take-up spools for the three films which are mounted on a shaft (or on concentrical or parallel shafts) parallel to the sprocket shaft 135.

In order to thread the films, three film spools are inserted in magazine 60 on a shaft (not shown) which is substantially parallel to sprocket shaft 135, the ends of the films being secured to three take-up spools similarly arranged on shaft 158. The films are threaded between rollers 251, 252 and 253 of the light seal 49 so that the three film loops are now arranged parallel side by side. Assuming that the films are to be exposed as described before with reference to Fig. 8, the film B bearing the blue recording emulsion is next to side door 36 and above sprocket roll 141, the film R with the red recording emulsion is in the center above sprocket roll 142 and the green recording film G is next to the sprocket drive above sprocket roll 143. The films are wound upon their spools in such a manner that the emulsions of films B and G face roller 251, whereas the emulsion of film R faces roller 252. The scissor units are opened and kept in this position by knobs 191 to 196, which, during the threading operation, are consecutively moved into closed position where they are again arrested by the knob pins and segments. The films are threaded in the following manner. Each film is first inserted between rollers 171 and 172, 271 and 272, respectively, and 181 and 182, respectively (Figs. 5, 6, 7), and films B and R, after the sprocket pins are inserted into the film perforations, are brought out again between rollers 173 and 174 and 273 and 274, respectively (Figs. 5 and 6). Film G emerges between sprocket roll 143 and roller 183 (Fig. 7). Films B and R are now turned a quarter turn longitudinally, and a half turn laterally towards aperture plate 61 (Fig. 1), whereby the two films are superposed so that they form a single loop, and they are now threaded into the film gate, the two emulsions being in contact with the blue sensitive film nearest to prism P, as shown in Fig. 8. Upon emerging from the film gate, the two superposed films B and R are again separated and returned to their sprocket wheels with loops converse of those between the upper rolls and the film gate. The films B and R are now introduced between rollers 177 and 178 and 277 and 278, respectively, their perforations engaged at the lower side of the sprocket rollers 141 and 142, where they are secured by rollers 176 and 177 and 276 and 277, respectively, and brought out over the upper side of rollers 171 and 271, respectively. As described before the emerging films are threaded between rollers 252 and 253 of the light seal and are ready to be wound upon the three take-up spools in magazine 50, which are arranged similar to the spools in magazine 60 and driven from pulley 253.

It should be understood that the present disclosure is for the purpose of illustration only, and that this invention includes all modifications and equivalents which fall within the scope of the appended claims.

I claim:

1. A motion picture camera comprising a rigid supporting block, a driving gear wheel on said block, two film gates, two film movements for transporting film through said gates each having a driven gear wheel, and means for mounting said gates and said movements on said block with said gear wheels meshing, said driving and driven gear wheels being maintained in definite relative position by said block.

2. A motion picture camera comprising a rigid supporting block, a driving spiral gear wheel on said block, two film gates, two film movements for transporting film through said gates each having a driven spiral gear wheel, and means for mounting said gates and said movements on said block with said gear wheels meshing, said driving and driven gear wheels being maintained in definite relative position by said block.

3. A motion picture camera comprising a base plate, driving means on said plate, a rigid central supporting block fixed to said plate, a driving gear wheel mounted on said block and rotated by said driving means, two film gates, two film movements for transporting film through said gates each actuated by a driven gear wheel, and means for mounting said gates and said movements on said block with said driving and driven gear wheels meshing, said gear wheels being by said block maintained in rigid position relatively to each other and to said plate.

4. A motion picture camera comprising a base plate, a driving main shaft extending along said plate, a rigid central supporting block fixed to said plate, two film gates, two film movements for transporting film through said gates each actuated by a driven film movement gear wheel, means for mounting said gates and said movements on said block, a group of substantially coaxial film sprockets for feeding film to said movements actuated by a driven pinion, a film movement shaft rising from said plate, driven from said main shaft, having a driving gear wheel mounted on said block and meshing with said film movement gear wheels, and a sprocket shaft rising from and mounted on said plate, driven from said main shaft and having a driving gear wheel meshing with said pinion, said driving and driven gear wheels being by said plate and said block maintained in rigid position relatively to each other.

5. A motion picture camera comprising a gear box having a top portion forming a camera base plate, a main drive shaft in said box mounted underneath said plate, a central supporting block fixed to the upper side of said plate, two film movements each actuated by a driven gear wheel, means for rigidly mounting said film movements on said block, an auxiliary shaft extending through said plate driven from said main shaft and having a driving gear wheel meshing with said driven gear wheels, a group of sprockets for transporting film to said movements mounted on said plate and actuated by a driven pinion, a second auxiliary shaft extending through said plate driven from said main shaft and having a driving gear wheel meshing with said pinion, and a flywheel fixed to one of said auxiliary shafts within said box.

JOSEPH A. BALL.